(12) United States Patent
Zhong et al.

(10) Patent No.: US 12,158,184 B2
(45) Date of Patent: Dec. 3, 2024

(54) INSULATED BEARING

(71) Applicant: Schaeffler Technologies AG & Co. KG, Herzogenaurach (DE)

(72) Inventors: Guihui Zhong, Charlotte, NC (US); Venkata Kottapalli, Fort Mill, SC (US); Michael Heaton, Rock Hill, SC (US); John Tate, Cornelius, NC (US); Charles Schwab, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 91 days.

(21) Appl. No.: 18/073,619

(22) Filed: Dec. 2, 2022

(65) Prior Publication Data
US 2024/0183399 A1    Jun. 6, 2024

(51) Int. Cl.
*F16C 33/58* (2006.01)
*F16C 33/62* (2006.01)
*F16C 35/077* (2006.01)

(52) U.S. Cl.
CPC .......... *F16C 33/583* (2013.01); *F16C 33/586* (2013.01); *F16C 33/62* (2013.01); *F16C 35/077* (2013.01)

(58) Field of Classification Search
CPC ...... F16C 19/52; F16C 33/583; F16C 33/586; F16C 33/62; F16C 35/077; F16C 2226/60; H02K 5/173
See application file for complete search history.

(56) References Cited

U.S. PATENT DOCUMENTS

| | | | | |
|---|---|---|---|---|
| 2,674,505 | A | * | 4/1954 | Pfenninger, Jr. ........ F16C 33/60 384/536 |
| 5,375,933 | A | * | 12/1994 | Mizutani ................. F16C 33/62 384/492 |
| 5,961,222 | A | * | 10/1999 | Yabe ..................... F16C 33/586 384/477 |
| 8,764,301 | B2 | | 7/2014 | Winkelmann et al. |
| 9,653,193 | B2 | | 5/2017 | Windrich et al. |

(Continued)

FOREIGN PATENT DOCUMENTS

| | | | | | |
|---|---|---|---|---|---|
| JP | 2002147468 | A | * | 5/2002 | ............. F16C 33/62 |
| JP | 2007002946 | A | * | 1/2007 | ............ F16C 27/066 |

(Continued)

OTHER PUBLICATIONS

Machine Translation of JP-2002147468-A (Year: 2002).*

(Continued)

*Primary Examiner* — Alan B Waits

(57) ABSTRACT

An insulated bearing includes an outer ring, a plurality of rolling elements, and an insulating cap. The outer ring has an inner rolling surface and an outer spiral groove, the rolling elements are in rolling contact with the inner rolling surface, and the insulating cap is screwed onto the outer ring. The insulating cap has an inner spiral, complementary to the outer spiral groove. In an example embodiment, the outer spiral groove comprises a cross-section having a shape selected from the group consisting of a rectangle, a triangle, and a trapezoid. In an example embodiment, the outer spiral groove has between 2 and 4 revolutions. In an example embodiment, the outer spiral groove has a width of 4 millimeters or less.

15 Claims, 4 Drawing Sheets

(56) References Cited

U.S. PATENT DOCUMENTS

| | | | |
|---|---|---|---|
| 11,767,884 B2 | 9/2023 | Zhong | |
| 2016/0238074 A1 | 8/2016 | Preis et al. | |
| 2018/0306243 A1* | 10/2018 | Iino | F16C 19/527 |
| 2021/0164518 A1* | 6/2021 | Feliciano | F16C 33/586 |

FOREIGN PATENT DOCUMENTS

| | | | | |
|---|---|---|---|---|
| JP | 2009210090 A | * | 9/2009 | F16C 33/586 |
| WO | WO-2022202651 A1 | * | 9/2022 | |

OTHER PUBLICATIONS

Machine Translation of JP-2007002946-A (Year: 2007).*
Machine Translation of JP-2009210090-A (Year: 2009).*
Machine Translation of WO-2022202651-A1 (Year: 2022).*
Unpublished U.S. Appl. No. 17/501,441, filed Oct. 14, 2021 Author: Schaeffler Technologies AG and Co. KG Country: United States.

* cited by examiner

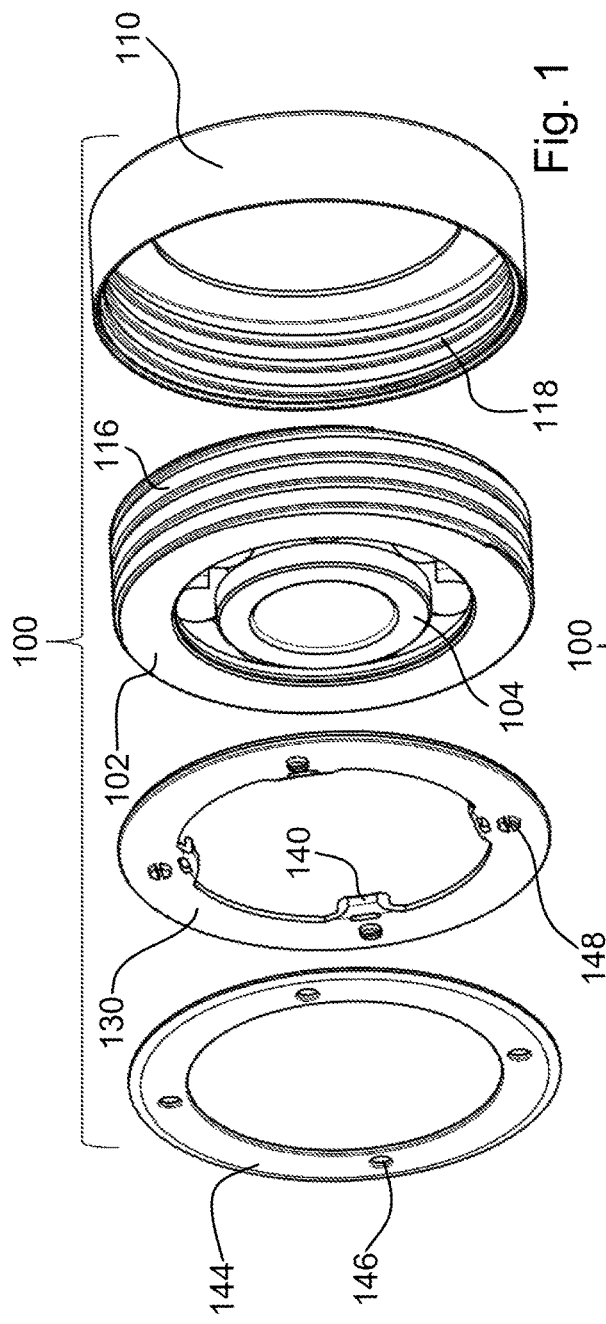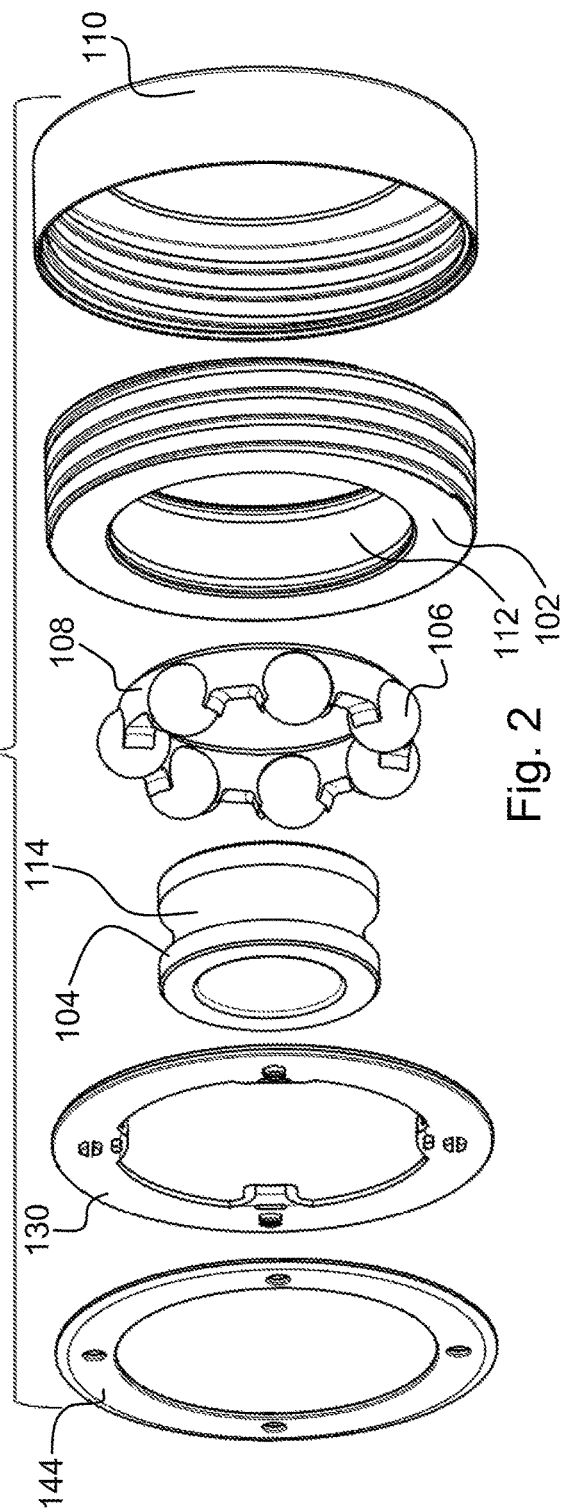

INSULATED BEARING

TECHNICAL FIELD

The present disclosure relates generally to a bearing, and more specifically to an insulated bearing.

BACKGROUND

Insulated bearings are known. One example is shown and described in commonly-assigned U.S. Pat. No. 8,764,301 titled THERMALLY INSULATED ANTI-FRICTION BEARING to Winkelmann et al., hereby incorporated by reference as if set forth fully herein.

SUMMARY

Example embodiments broadly comprise an insulated bearing including an outer ring, a plurality of rolling elements, and an insulating cap. The outer ring has an inner rolling surface and an outer spiral groove, the rolling elements are in rolling contact with the inner rolling surface, and the insulating cap is screwed onto the outer ring. The insulating cap has an inner spiral, complementary to the outer spiral groove. In an example embodiment, the outer spiral groove comprises a cross-section having a shape selected from the group consisting of a rectangle, a triangle, and a trapezoid. In an example embodiment, the outer spiral groove has between 2 and 4 revolutions. In an example embodiment, the outer spiral groove has a width of 4 millimeters or less.

In some example embodiments, the outer ring has a radial thickness and the outer spiral groove has a groove depth less than half of the radial thickness. In an example embodiment, the groove depth is between 1 and 2 millimeters. In some example embodiments, the insulating cap has a thickness greater than 0.5 mm. In an example embodiment, the thickness is greater than or equal to 1 millimeter. In some example embodiments, the insulating cap is molded from a plastic. In an example embodiment, the plastic is selected from the group consisting of PPS, PEEK, PET, PTFE, PVC, PA46-GF30, PA66-GF30, and PAI.

In some example embodiments, the insulating cap has a cylindrical portion, the inner spiral protruding radially inward therefrom, and an insulating cap annular portion extending radially inward from the cylindrical portion. In an example embodiment, the outer ring has a second annular surface and the insulating cap is screwed onto the outer ring until the insulating cap annular portion contacts the second annular surface.

In some example embodiments, the insulated bearing also includes an insulating cover snapped onto the outer ring. In an example embodiment, the insulating cover is molded from plastic. In some example embodiments, the outer ring has a first annular surface and the insulating cover has an insulating cover annular portion contacting the first annular surface. In an example embodiment, the outer ring has an inner cylindrical surface with a groove and the insulated cover has an axial protrusion extending from a radially inner portion of the insulating cover annular portion, the axial protrusion having a radially outwardly extending protrusion disposed in the groove.

In some example embodiments, the insulated bearing also includes a metal washer with an aperture. The insulating cover has a protrusion extending axially from the insulating cover annular portion into the aperture to retain the metal washer on the insulating cover. In an example embodiment, the metal washer has a radially outer chamfer.

BRIEF DESCRIPTION OF THE DRAWINGS

FIG. 1 illustrates a perspective exploded view of an insulated bearing according to an example embodiment.

FIG. 2 illustrates a further perspective exploded view of the insulated bearing of FIG. 1.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 3:
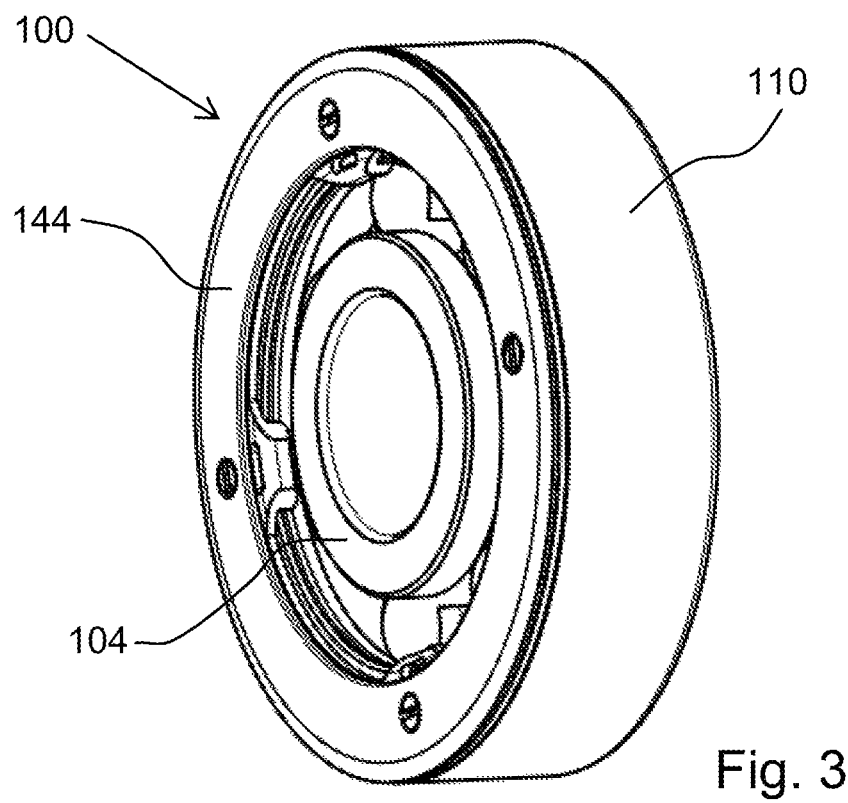
FIG. 3 illustrates a perspective view of the insulated bearing of FIG. 1.
Figure 4:
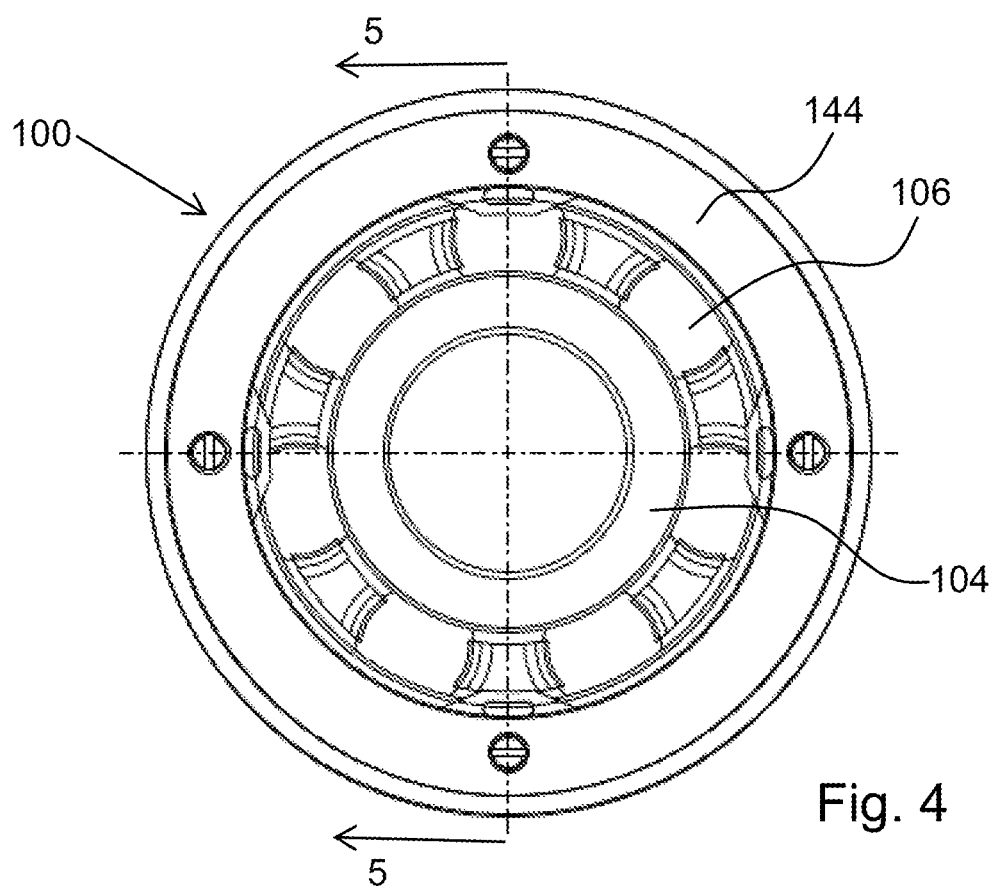
FIG. 4 illustrates a front view of the insulated bearing of FIG. 1.
Figure 5:
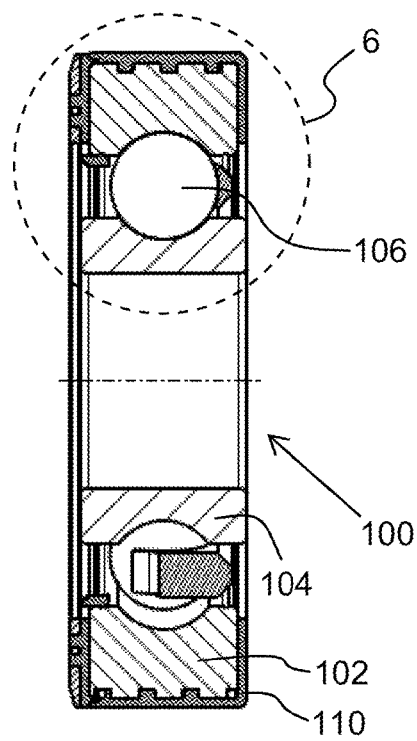
FIG. 5 illustrates a cross-sectional view of the insulated bearing of FIG. 1 taken generally along line 5-5 in FIG. 4.
Figure 6:
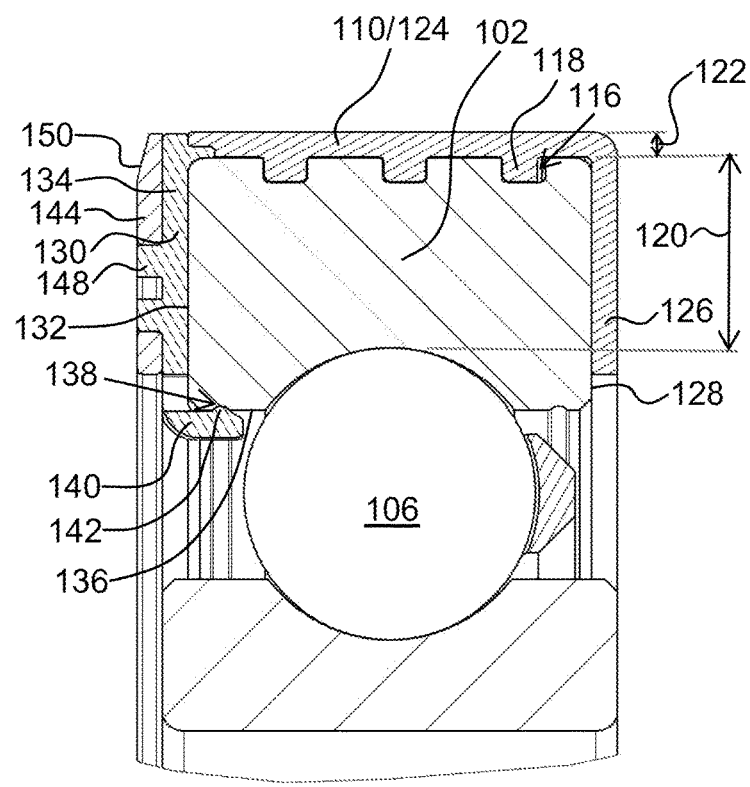
FIG. 6 illustrates a detail view of encircled region 6 in FIG. 5.

The following disclosure is made with reference to FIGS. 1-6. FIG. 1 illustrates a perspective exploded view of insulated bearing 100. FIG. 2 illustrates a further perspective exploded view of insulated bearing 100 of FIG. 1. FIG. 3 illustrates a perspective view of insulated bearing 100 of FIG. 1. FIG. 4 illustrates a front view of insulated bearing 100 of FIG. 1. FIG. 5 illustrates a cross-sectional view of insulated bearing 100 of FIG. 1 taken generally along line 5-5 in FIG. 4. FIG. 6 illustrates a detail view of encircled region 6 in FIG. 5.

Insulated bearing 100 includes outer ring 102, inner ring 104, rolling elements 106, cage 108 and insulating cap 110. The example bearing shown is a deep groove ball bearing (DGBB). Although rolling elements 106 are shown as balls, bearing 100 may include other rolling elements. For example, in other example embodiments, rolling elements may be cylindrical, needle, or tapered rollers (not shown). Outer ring 102 includes inner rolling surface 112 and inner ring 104 includes outer rolling surface 114. Rolling elements 106 are arranged to roll between surfaces 112 and 114. Cage 108 positions and guides rolling elements 106 in a known manner.

Outer ring 102 also includes outer spiral groove 116. Groove 116 may be added to outer ring 102 by hard turning and deburring, for example. Because groove 116 has a spiral shape, it does not completely cut through any cross section of the outer ring, reducing disruption to bearing outer diameter contact. Rolling elements 106 roll on inner rolling surface 112 and outer rolling surface 116 of inner ring 104. In other words, the rolling elements are in rolling contact with the inner rolling surface and the outer rolling surface. Insulating cap 110 includes inner spiral 118, complementary to outer spiral groove 116. The insulating cap screwed onto the outer ring to secure the insulating cap to the outer ring.

As can be seen in FIG. 6, for example, the outer spiral groove has a rectangular cross-section, but other embodiments (not shown) may include an outer spiral groove having a cross-section with another shape (e.g., triangle or trapezoid). In these cases, the inner spiral would have a complementary triangle or trapezoid shape, for example. As can be seen in FIGS. 1 and 2, for example, the outer spiral groove has between 2 and 4 revolutions. In the example embodiment shown, the outer spiral groove has about 3.5 complete revolutions. The inventors have found that an outer spiral groove having a width of 4 millimeters or less is desirable for durability of the outer ring. Similarly, a groove depth of less than half of radial thickness 120 of the outer ring, or between 1 and 2 millimeters, also maintains durability of the outer ring. By limiting the width and depth of the groove, structural integrity of the outer ring is maintained so that the outer ring is not deformed at high bearing loads.

In order to ensure strength and sufficient insulating properties, insulating cap 110 may have a thickness 122 of at least 0.5 mm. Some embodiments may include a thickness 122 greater than or equal to 1 mm, for example. The insulating cap may be molded from a plastic due to its insulating properties and inexpensive forming methods. For example, the insulating cap may be formed from polyphenylene sulfide (PPS), polyetheretherketone (PEEK), polyethylene terephthalate (PET), polytetrefluoroethylene (PTFE), polyvinyl chloride (PVC), polyamide 46 reinforced with 30% glass fiber (PA46-GF30), polyamide 66 reinforced with 30% glass fiber (PA66-GF30), or polyamide-imide (PAI, i.e., Torlon). Selection of an appropriate plastic for insulating cap 110 may partially depend on the bearing's operating temperature and environment.

As shown in FIG. 6, for example, the insulating cap includes cylindrical portion 124, with inner spiral 118 protruding radially inward from the cylindrical portion, and insulating cap annular portion 126 extending radially inward from the cylindrical portion. Outer ring 102 includes annular surface 128 and the insulating cap is screwed onto the outer ring until the insulating cap annular portion contacts the annular surface 128. That is, because the groove is a spiral, as the insulating cap rotates relative to the outer ring, the cap is axially translated across the outer ring until portion 126 contacts surface 128, ensuring a tight fit between the two components.

Insulated bearing 100 also includes insulating cover 130 snapped onto the outer ring as described below. Similar to the insulating cap described above, the insulating cover is molded from plastic. Returning to FIG. 6, outer ring 102 includes annular surface 132 and the insulating cover includes insulating cover annular portion 134 contacting annular surface 132. Outer ring 102 includes inner cylindrical surface 136 with groove 138 and the insulated cover includes axial protrusion 140 extending from a radially inner portion of the insulating cover annular portion 134. Protrusion 140 includes radially outwardly extending protrusion 142 disposed in the groove. In other words, protrusion 142 is snapped into the groove.

Insulated bearing 100 also includes metal washer 144 with aperture 146. Washer 144 may be a stamped metal component, for example. The insulating cover includes protrusion 148 extending axially from the insulating cover annular portion into the aperture to retain the metal washer on the insulating cover. Washer 144 includes radially outer chamfer 150.

Figure 7:
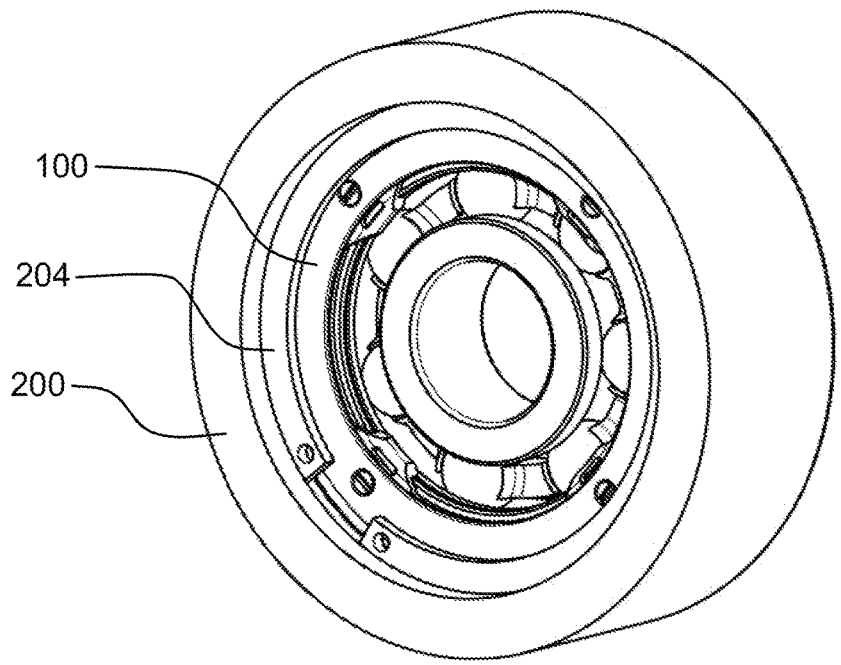
FIG. 7 illustrates a perspective view of the insulated bearing of FIG. 1 shown assembled in an example housing.
Figure 8:
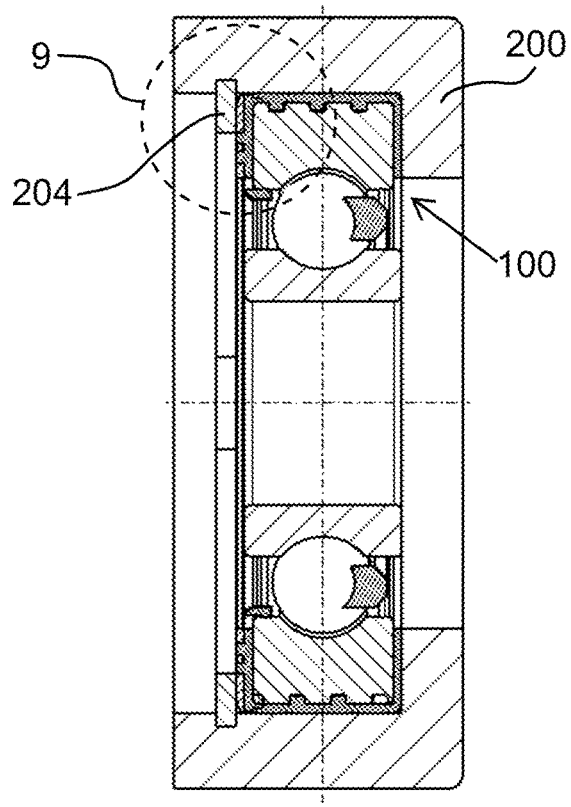
FIG. 8 shows a cross-sectional view of the insulated bearing and housing of FIG. 7.
Figure 9:
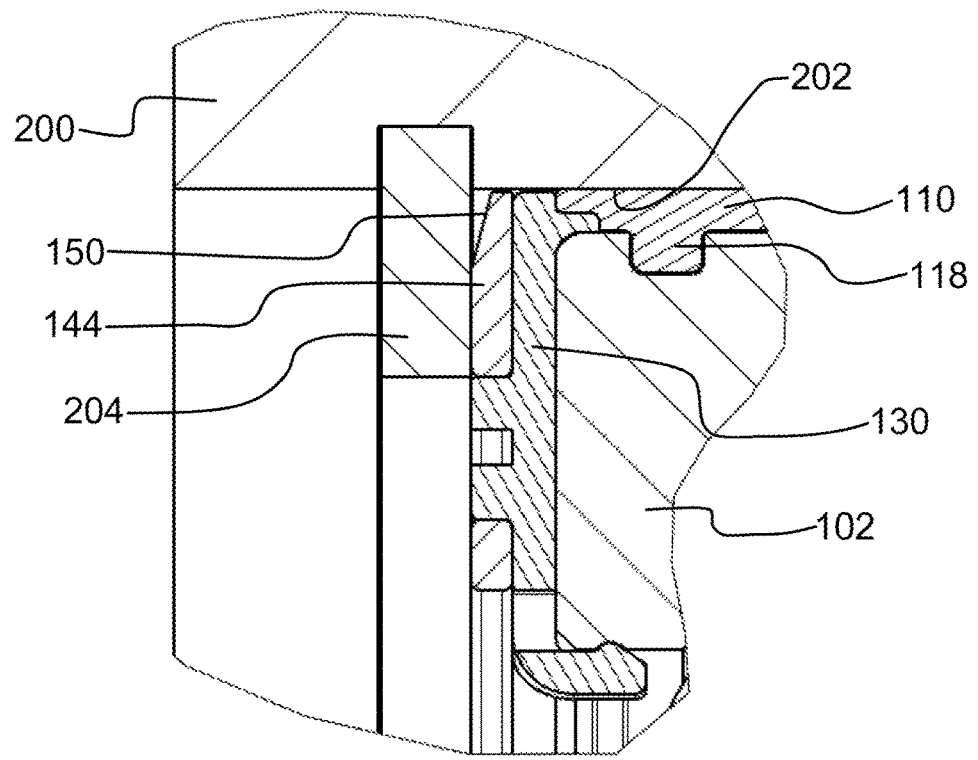
FIG. 9 shows a detail view of encircled region 9 in FIG. 8.

The following description is made with reference to FIGS. 1-9. FIG. 7 illustrates a perspective view of insulated bearing 100 shown assembled in housing 200. FIG. 8 shows a cross-sectional view of the insulated bearing and housing of FIG. 7. FIG. 9 shows a detail view of encircled region 9 in FIG. 8. As can be seen in the figures, bearing 100 is installed, or seated, in housing bore 202 and insulated from housing 200 by insulating cap 110. In this application, insulating cap 110 has a slip-fit with the non-rotating housing. Snap ring 204 retains the bearing in the housing. Metal washer 144 with chamfer 150 prevents damage to insulating cover 130 from snap ring 204 by moving a typical root (corner) contact between the snap ring and insulating cover to a middle of a contact face from the root area. This prevents a pinching of the insulating cover at the root area.

Insulating cover 130 insulates insulated bearing 100 from metal washer 144 and snap ring 204. The cap and cover fully insulate the bearing. In other words, insulating cap 110 and insulating cover 130 electrically insulate bearing outer ring 102 from housing 200 and/or a shaft (not shown) to prevent damage from electrical current flowing through raceways in the outer and inner rings through rolling elements of bearing 100. Allowing current to flow may cause arcing, pitting or other damage to the bearing. This damage roughens contact surfaces between the raceways and rolling elements, eventually leading to failure. An insulated bearing is important to prevent electrical discharge machining (EDM) of bearings for electric motors and/or electric axles where automatic transmission fluid (ATF) is present, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Insulating bearing
102 Outer ring
104 Inner ring
106 Rolling elements
108 Cage
110 Insulating cap
112 Inner rolling surface (outer ring)
114 Outer rolling surface (inner ring)
116 Outer spiral groove (outer ring)
118 Inner spiral (insulating cap)
120 Radial thickness (outer ring)
122 Thickness (insulating cap)
124 Cylindrical portion (insulating cap)
126 Annular portion (insulating cap)
128 Annular surface (outer ring, second)
130 Insulating cover
132 Annular surface (outer ring, first)
134 Annular portion (insulating cover)
136 Inner cylindrical surface (outer ring)
138 Groove (outer ring inner cylindrical surface)
140 Axial protrusion (insulated cover)
142 Radially outwardly extending protrusion
144 Metal washer
146 Aperture (metal washer)
148 Protrusion (insulated cover)
150 Radially outer chamfer (metal washer)
200 Housing
202 Housing bore
204 Snap ring

What is claimed is:

1. An insulated bearing, comprising:
an outer ring comprising:
an inner rolling surface;
an outer spiral groove; and
a first annular surface;
a plurality of rolling elements in rolling contact with the inner rolling surface;
an insulating cap screwed onto the outer ring, the insulating cap comprising an inner spiral, complementary to the outer spiral groove;
a metal washer comprising an aperture; and
an insulating cover snapped onto the outer ring, the insulating cover comprising:
an insulating cover annular portion contacting the first annular surface; and
a protrusion extending axially from the insulating cover annular portion into the aperture to retain the metal washer on the insulating cover.

2. The insulated bearing of claim 1 wherein the outer spiral groove comprises a cross-section having a shape selected from the group consisting of a rectangle, a triangle, and a trapezoid.

3. The insulated bearing of claim 1 wherein the outer spiral groove comprises between 2 and 4 revolutions.

4. The insulated bearing of claim 1 wherein the outer spiral groove comprises a width of 4 millimeters or less.

5. The insulated bearing of claim 1 wherein:
the outer ring comprises a radial thickness; and
the outer spiral groove comprises a groove depth less than half of the radial thickness.

6. The insulated bearing of claim 5 wherein the groove depth is between 1 and 2 millimeters.

7. The insulated bearing of claim 1 wherein the insulating cap comprises a thickness greater than 0.5 mm.

8. The insulated bearing of claim 7 wherein the thickness is greater than or equal to 1 millimeter.

9. The insulated bearing of claim 1 wherein the insulating cap is molded from a plastic.

10. The insulated bearing of claim 9 wherein the plastic is selected from the group consisting of PPS, PEEK, PET, PTFE, PVC, PA46-GF30, PA66-GF30, and PAI.

11. The insulated bearing of claim 1 wherein the insulating cap comprises:
a cylindrical portion, the inner spiral protruding radially inward therefrom; and
an insulating cap annular portion extending radially inward from the cylindrical portion.

12. The insulated bearing of claim 11 wherein:
the outer ring comprises a second annular surface; and
the insulating cap is screwed onto the outer ring until the insulating cap annular portion contacts the second annular surface.

13. The insulated bearing of claim 1 wherein the insulating cover is molded from plastic.

14. The insulated bearing of claim 1 wherein:
the outer ring comprises an inner cylindrical surface with a groove; and
the insulated cover comprises an axial protrusion extending from a radially inner portion of the insulating cover annular portion, the axial protrusion comprising a radially outwardly extending protrusion disposed in the groove.

15. The insulated bearing of claim 1 wherein the metal washer comprises a radially outer chamfer.

* * * * *